(12) United States Patent
Morinaga

(10) Patent No.: US 11,637,299 B2
(45) Date of Patent: Apr. 25, 2023

(54) HYDROGEN LEAKAGE DETECTION SYSTEM

(71) Applicant: TOYOTA JIDOSHA KABUSHIKI KAISHA, Toyota (JP)

(72) Inventor: Masahiko Morinaga, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 17/209,312

(22) Filed: Mar. 23, 2021

(65) Prior Publication Data

US 2021/0344025 A1    Nov. 4, 2021

(30) Foreign Application Priority Data

May 1, 2020   (JP) .............................. JP2020-080998

(51) Int. Cl.
| | |
|---|---|
| *H01M 8/04664* | (2016.01) |
| *H01M 8/0438* | (2016.01) |
| *B60L 50/71* | (2019.01) |
| *G01M 3/04* | (2006.01) |
| *H01M 8/04082* | (2016.01) |

(52) U.S. Cl.
CPC ......... *H01M 8/04686* (2013.01); *B60L 50/71* (2019.02); *G01M 3/04* (2013.01); *H01M 8/04201* (2013.01); *H01M 8/04425* (2013.01); *H01M 2250/20* (2013.01)

(58) Field of Classification Search
CPC ...... B60L 3/0053; B60L 50/71; G01M 3/025; G01M 3/04; H01M 2250/20; H01M 8/04201; H01M 8/04425; H01M 8/0444; H01M 8/04664; H01M 8/04686; H01M 8/2475; Y02T 90/40
See application file for complete search history.

(56) References Cited

U.S. PATENT DOCUMENTS

| | | |
|---|---|---|
| 2003/0168337 A1 | 9/2003 | Mizutani et al. |
| 2006/0269806 A1 | 11/2006 | Suzuki et al. |
| 2009/0061261 A1 | 3/2009 | Hatta et al. |
| 2012/0308906 A1* | 12/2012 | Paganelli .......... H01M 8/04671 429/429 |
| 2019/0305340 A1 | 10/2019 | Imamura et al. |

FOREIGN PATENT DOCUMENTS

| | | |
|---|---|---|
| JP | 2001027626 A | 1/2001 |
| JP | 2005124357 A | 5/2005 |
| JP | 2006-327396 A | 12/2006 |
| JP | 2009-063352 A | 3/2009 |
| JP | 2009-277594 A | 11/2009 |
| JP | 2010-012958 A | 1/2010 |
| JP | 2019087384 A | 6/2019 |
| JP | 2019177743 A | 10/2019 |

* cited by examiner

*Primary Examiner* — Victoria H Lynch
(74) *Attorney, Agent, or Firm* — Dickinson Wright, PLLC

(57) ABSTRACT

A hydrogen leakage detection system for detecting a hydrogen leakage in a fuel cell system includes: an outer shell configured to accommodate a hydrogen flow section; a hydrogen sensor; and a porous sheet disposed to delimit at least a part of a space within the outer shell and allowing permeation of hydrogen through the porous sheet in a thickness direction thereof. The hydrogen flow section is disposed in a region below the porous sheet, and the hydrogen sensor is disposed in a region above the porous sheet.

5 Claims, 12 Drawing Sheets

HYDROGEN LEAKAGE DETECTION SYSTEM

CROSS-REFERENCE TO RELATED APPLICATIONS

This application claims priority under 35 USC 119 to Japanese Patent Application No. 2020-080998 filed on May 1, 2020, the entire disclosure of which is incorporated herein by reference.

BACKGROUND

Field

The present disclosure relates to a hydrogen leakage detection system to detect a hydrogen leakage in a fuel cell system.

Related Art

A part of a fuel cell system such as a fuel cell stack may be disposed in a closed space such as in a front compartment of a vehicle. In this arrangement, if hydrogen leaks from the fuel cell stack or any other hydrogen-flowing portion, it is desirable to detect the hydrogen leakage before a hydrogen concentration within the space becomes too high. In one proposed arrangement for detecting such a hydrogen leakage, a vehicle-driving auxiliary device is connected to an upper portion of a fuel cell stack via a fixing member, whose cross-sectional shape is open only at a top side thereof when it is mounted on a vehicle (e.g., see Japanese Unexamined Patent Application Publication No. 2005-124357). This arrangement prevents accumulation of leaking hydrogen below the fixing member and facilitates hydrogen leakage detection by a hydrogen sensor installed in the front compartment.

However, even though hydrogen leaking from a fuel cell stack is allowed to move upward without being hindered by the fixing member or any other components, detection of a hydrogen leakage may be still late in some cases. For example, hydrogen leaking from a fuel cell stack moves upward and then accumulates near an upper inner wall of the front compartment. If a hydrogen sensor is disposed remotely from a location on the inner wall of the front compartment where the leaking hydrogen moving upward will reach as described above, it takes a long time until the hydrogen concentration around the hydrogen sensor reaches or exceeds the limit of detection, which delays detection of the hydrogen leakage. One possible method for reducing such a delay in hydrogen leakage detection would be to increase the number of hydrogen sensors, but it is desirable to avoid increasing the number of the hydrogen sensors. This is a problem encountered not only by vehicle-mounted fuel cell systems but also by stationary fuel cell systems.

SUMMARY

An aspect of the present disclosure is a hydrogen leakage detection system for detecting a hydrogen leakage in a fuel cell system. The hydrogen leakage detection system includes an outer shell, a hydrogen sensor, and a porous sheet. The outer shell configured to accommodate a hydrogen flow section, including at least one device of a fuel cell and a hydrogen tank storing hydrogen to be supplied to the fuel cell; and a hydrogen piping section including a hydrogen pipe connected to the at least one device. The hydrogen sensor is disposed within the outer shell. The porous sheet is disposed to delimit at least a part of a space within the outer shell, and allows permeation of hydrogen through the porous sheet in a thickness direction thereof. The hydrogen flow section is disposed in a region below the porous sheet, and the hydrogen sensor is disposed in a region above the porous sheet. The hydrogen leakage detection system of this aspect has, within the outer shell, the hydrogen flow section disposed in a region below the porous sheet, and the hydrogen sensor disposed in a region above the porous sheet. In the event that any defect occurs in the hydrogen flow section and hydrogen inside the hydrogen flow section is ejected from the defect site, this arrangement allows permeation of the ejected hydrogen through the porous sheet, and thus can expand a region with a hydrogen concentration high enough to be detectable by the hydrogen sensor. Hence, this arrangement enables quicker detection of a hydrogen leakage by the hydrogen sensor.

DETAILED DESCRIPTION

A. First Embodiment

Figure 1:
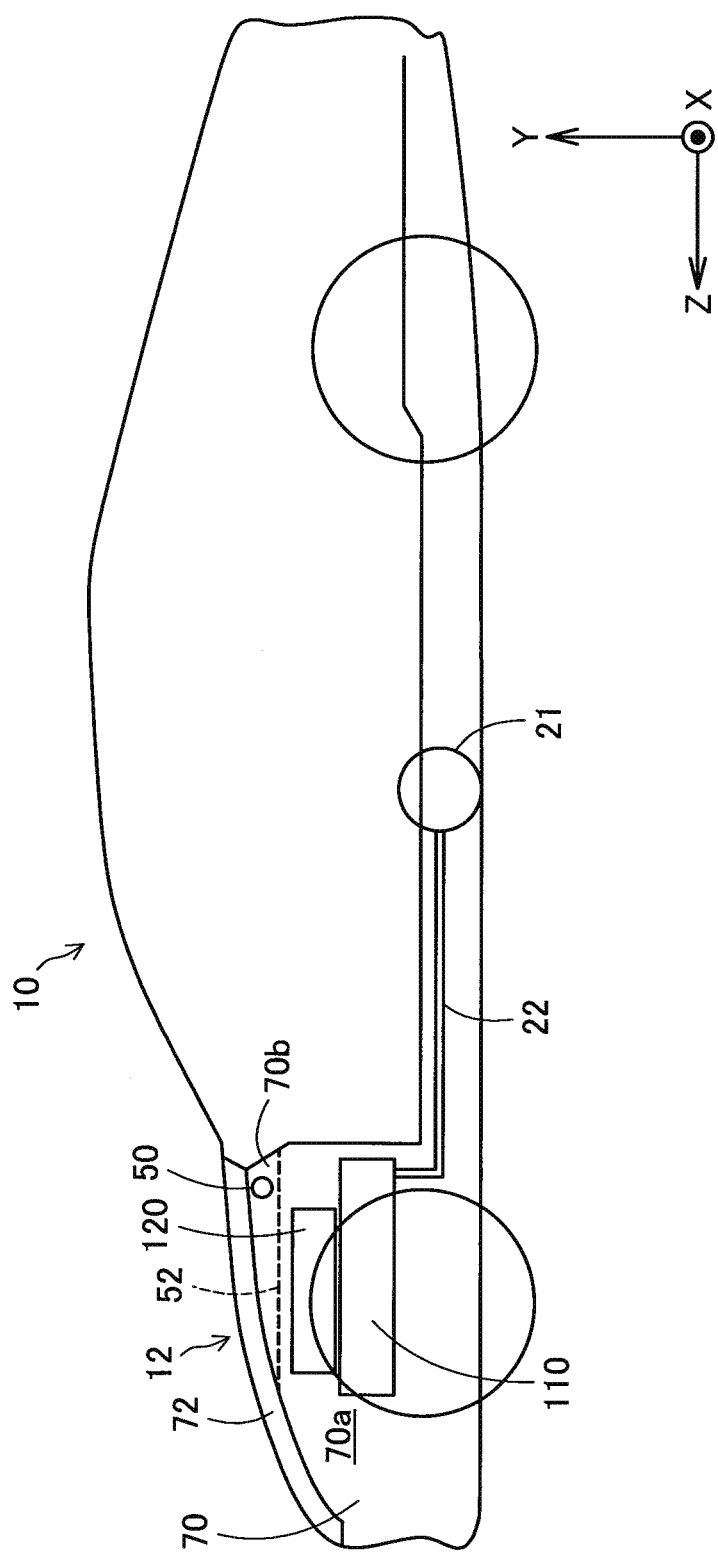
FIG. 1 illustrates a general configuration of a fuel cell vehicle.

FIG. 1 illustrates a general configuration of a fuel cell vehicle 10 equipped with a hydrogen leakage detection system 12 in accordance with a first embodiment of the present disclosure. X, Y, and Z axes shown in FIG. 1 and FIG. 4 (discussed later) are perpendicular to each other. A +X direction designates a "leftward direction" of the fuel cell vehicle 10, and a −X direction designates a "rightward direction" thereof. A +Y direction designates an "upward direction" of the fuel cell vehicle 10, and a −Y direction designates a "downward direction" thereof. The Y direction also designates a vertical direction. A +Z direction indicates forward in a traveling direction of the fuel cell vehicle 10, and a −Z direction indicates rearward in the traveling direction thereof. The X and Z directions also designate a horizontal direction.

Figure 2:
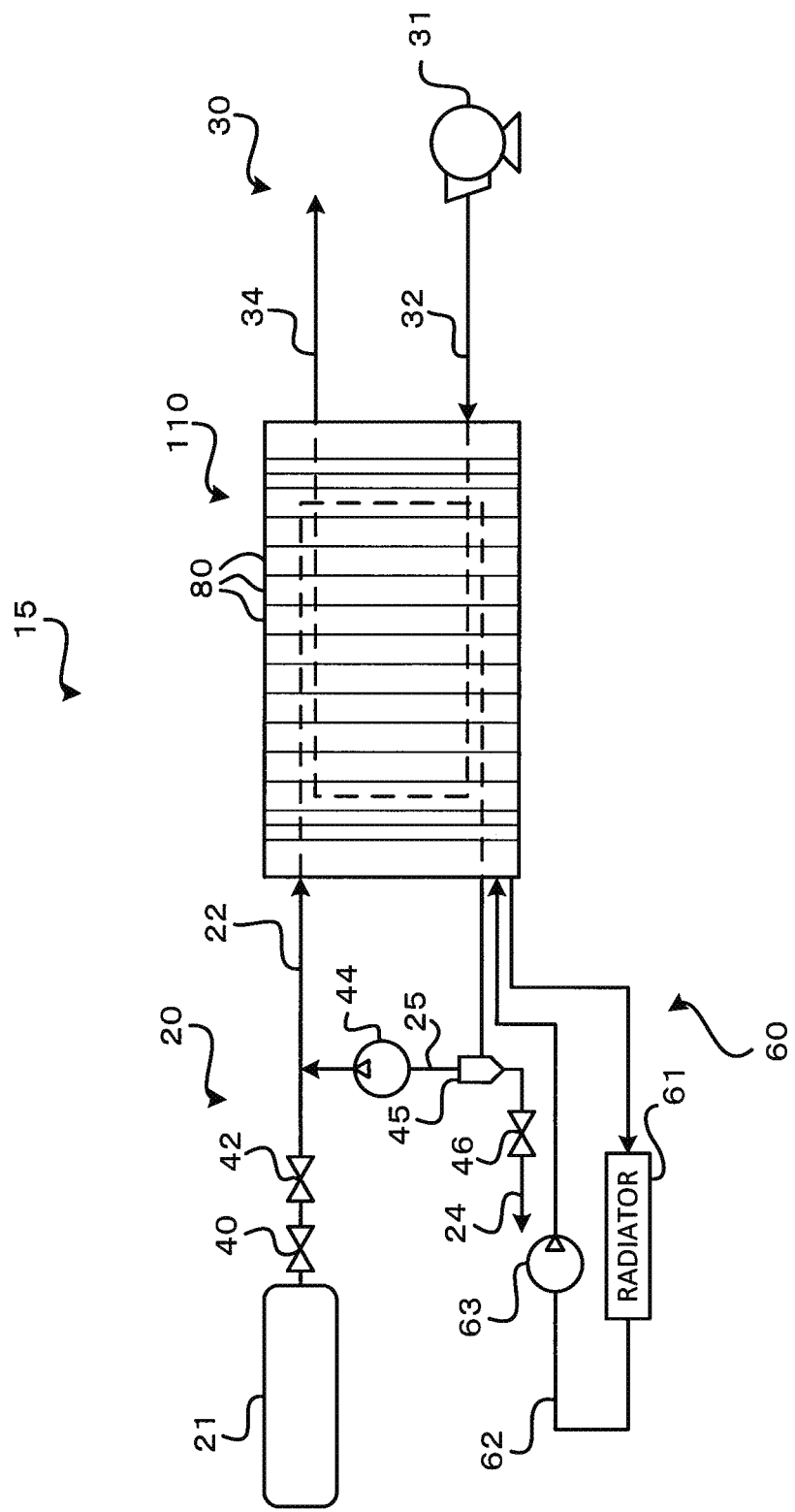
FIG. 2 illustrates a general configuration of a fuel cell system.

FIG. 2 illustrates a general configuration of a fuel cell system 15 mounted on the fuel cell vehicle 10. Below a description will be first given of the fuel cell system 15 based on FIG. 2.

The fuel cell system 15 includes a fuel cell 110, a hydrogen supply system 20 operative to supply hydrogen as fuel gas to the fuel cell 110, an oxidizing gas supply system 30 operative to supply air as oxidizing gas to the fuel cell 110, and a cooling system 60 operative to distribute a refrigerant to the fuel cell 110.

The fuel cell 110 is composed of a stack of multiple single cells 80 each being a power generator. While in the present embodiment the fuel cell 110 is a polymer electrolyte fuel cell, a fuel cell of any other kind may be used.

The hydrogen supply system 20 includes a hydrogen tank 21, a hydrogen supply channel 22 connecting the hydrogen tank 21 and the fuel cell 110, a hydrogen discharge channel 24 connected to the fuel cell 110 to discharge anode off-gas from the fuel cell 110, and a circulation channel 25 connecting the hydrogen supply channel 22 and the hydrogen discharge channel 24 to circulate at least part of the anode off-gas into the hydrogen supply channel 22. The hydrogen supply channel 22, the hydrogen discharge channel 24, and the circulation channel 25 each include multiple hydrogen pipes and are also referred to as a "hydrogen piping section". In the hydrogen supply system 20, hydrogen gas stored in the hydrogen tank 21 goes through a main stop valve 40 controlling opening/closing of the hydrogen supply channel 22, has its pressure reduced by a pressure-reducing valve 42, and is then supplied to the fuel cell 110 from an injector. Pressure of the hydrogen circulating through the circulation channel 25 is regulated by a hydrogen pump 44. Part of the anode off-gas is released to the atmosphere via a gas-liquid separator 45 and an open/close valve 46 disposed in the hydrogen discharge channel 24. Impurities other than hydrogen (e.g., water vapor and nitrogen) contained in the hydrogen gas circulating through the circulation channel 25 can be thus discharged out of the channel.

The oxidizing gas supply system 30 includes an air compressor 31, an oxidizing gas supply pipe 32, and an oxidizing gas discharge pipe 34. The air compressor 31 compresses air and supplies it to the fuel cell 110 via the oxidizing gas supply pipe 32. Cathode off-gas discharged from the fuel cell 110 is discharged out of the fuel cell system 15 via the oxidizing gas discharge pipe 34.

The cooling system 60 includes a refrigerant channel 62, a radiator 61, and a refrigerant pump 63. The refrigerant channel 62 is connected at its both ends to a refrigerant channel inside the fuel cell 110. The refrigerant pump 63 is disposed in the refrigerant channel 62, and driving the refrigerant pump 63 causes the refrigerant to circulate between the refrigerant channel inside the fuel cell 110 and the refrigerant channel 62. The radiator 61 is disposed in the refrigerant channel 62 to cool the refrigerant flowing in the refrigerant channel 62.

Returning to FIG. 1 showing the fuel cell vehicle 10, the fuel cell 110 is disposed within a front compartment 70 covered with a front hood 72. The front compartment 70 defines a space in front of a vehicle cabin of the fuel cell vehicle 10. The front compartment 70 is also called an "outer shell". FIG. 1 also depicts the hydrogen tank 21 disposed within an underfloor space below the vehicle cabin of the fuel cell vehicle 10, and the hydrogen supply channel 22 connecting the hydrogen tank 21 and the fuel cell 110. A part of the fuel cell system 15 is accommodated in the front compartment 70, and a hydrogen-flowing portion of this accommodated part, including the fuel cell 110 and the hydrogen piping section connected to the fuel cell 110, is also referred to as a "hydrogen flow section".

Other various devices are also disposed in the front compartment 70. By way of example, FIG. 1 depicts a high-voltage unit 120 disposed on the fuel cell 110, and omits illustration of other devices in the front compartment 70. The high-voltage unit 120 may include, for example, a DC-DC converter that boosts a voltage output from the fuel cell 110 to a voltage suitable for driving a vehicle-driving motor (not shown) and the air compressor 31, and an inverter that functions as a driver for the hydrogen pump 44 and the refrigerant pump 63. The front compartment 70 may also accommodate various instruments and devices such as a vehicle-driving motor and an air-conditioner, in addition to fuel cell auxiliary devices.

In the front compartment 70, a hydrogen sensor 50 is also disposed at a position remote from the front hood 72. Also disposed in the front compartment 70 is a porous sheet 52. The hydrogen sensor 50 and the porous sheet 52 constitute, together with connection portions (joints) between pipes and the like described later, the hydrogen leakage detection system 12 of the present embodiment. The positional relationship of these components will be detailed later.

Figure 3:
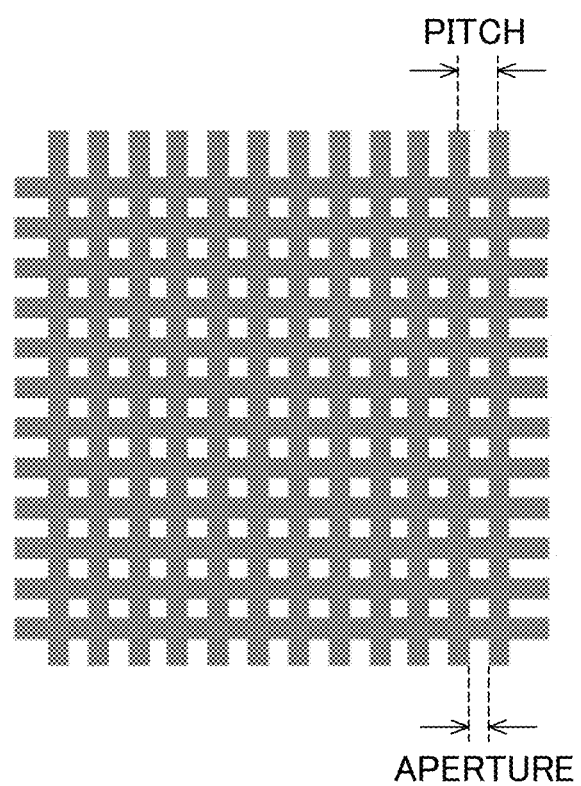
FIG. 3 is a plan view of a porous sheet.

FIG. 3 is a plan view of the porous sheet 52 in the present embodiment. The porous sheet 52 in the present embodiment is formed of a mesh and has a structure that allows permeation of hydrogen through the porous sheet 52 in a thickness direction thereof. In view of ensuring efficient permeation of hydrogen in the thickness direction of the porous sheet 52, an open area percentage of the porous sheet 52 in plan view is preferably not less than 10%, and more preferably not less than 20%. As will be described later, when hydrogen leaking from a connection portion between the pipes and the like flows onto a surface of the porous sheet 52, the porous sheet 52 functions to disturb the hydrogen flow to spread it over the surface while allowing permeation of hydrogen through the porous sheet 52 in the thickness direction. Thus, in view of ensuring the function of spreading the hydrogen flow over the surface of the porous sheet 52 as described above, the open area percentage of the porous sheet 52 is preferably not more than 60%, and more preferably not more than 50%. The open area percentage of the porous sheet 52 may, however, be less than 10% or more than 60%. The open area percentage of the porous sheet 52 formed of a mesh, namely a percentage of the open area of the mesh to the entire area thereof, may be obtained by the following expression (1) based on a mesh aperture (distance between wires or strands) and a pitch (see FIG. 3).

$$\text{Open area percentage (\%)} = (\text{aperture/pitch})^2 \times 100 \qquad (1)$$

In view of ensuring strength suitable for handling, the thickness of the porous sheet 52 is preferably not less than 0.2 cm, and more preferably not less than 0.5 cm. In view of reducing the space occupied by the porous sheet 52 or the weight of the porous sheet 52, the thickness of the porous sheet 52 is preferably not more than 2.0 cm, and more preferably not more than 1.0 cm.

The porous sheet 52 may be chosen from various materials that are strong enough to maintain the structure of the porous sheet 52 even when hydrogen is ejected from a defect in a connection portion between the pipes and the like and directed to the surface of the porous sheet 52 under a pressure depending on a hydrogen pressure inside the pipes and the like, and that are also heat-resistant, cold-resistant, and corrosion-resistant enough to withstand the environment in which the porous sheet 52 is used. Examples of the materials include metal materials such as stainless steel, nickel alloy, and aluminum alloy, and resin materials such as polyester, nylon, polyphenylene sulfide (PPS), polytetrafluoroethylene (PTFE), and polyetheretherketone (PEEK).

As shown in FIG. 1, the porous sheet 52 is disposed to delimit at least a part of the space within the front compartment 70. When the inside of the front compartment 70 is viewed in the horizontal direction (in the direction parallel to the X-Z plane), the hydrogen flow section that constitutes at least a part of the fuel cell system 15 is disposed in a region below (in the −Y direction relative to) the porous sheet 52. The hydrogen flow section is a structure including the fuel cell 110 and the hydrogen piping section (e.g., a part of the hydrogen supply channel 22 shown in FIG. 1) connected to the fuel cell 110. In FIG. 1, the region below the porous sheet 52 is denoted as a region 70a. Also, when the inside of the front compartment 70 is viewed in the horizontal direction, the hydrogen sensor 50 is disposed in a region above (in the +Y direction relative to) the porous sheet 52. In FIG. 1, the region above the porous sheet 52 is denoted as a region 70b.

In the present embodiment, when the inside of the front compartment 70 is viewed in the vertical direction (Y direction), a plurality of connection portions and the hydrogen sensor 50 are disposed to overlap the porous sheet 52. The plurality of connection portions includes any of a connection portion between the hydrogen pipes constituting the aforementioned hydrogen piping section connected to the fuel cell 110, a connection portion between the fuel cell 110 and any one of the hydrogen pipes constituting the hydrogen piping section, and a connection portion between any one of the hydrogen pipes and another device that is different from the fuel cell 110 and connected to the hydrogen piping section to flow hydrogen therein. Hereinafter, these three kinds of connection portions are also collectively called "pipe connection portions".

Figure 4:
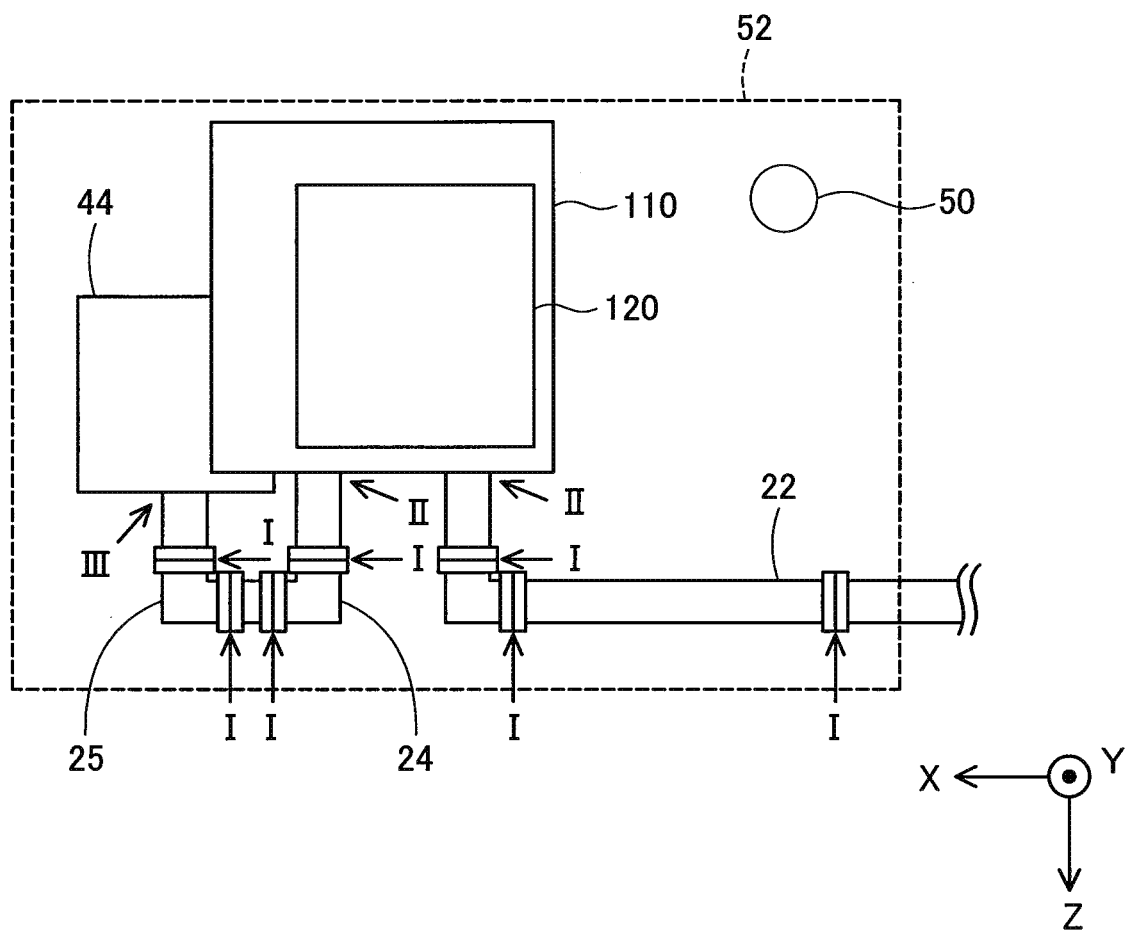
FIG. 4 schematically illustrates an exemplary arrangement within a front compartment.

FIG. 4 schematically illustrates an exemplary arrangement inside the front compartment 70 when it is viewed in the vertical direction (Y direction). In FIG. 4, an arrow I indicates a position of each connection portion between adjoining hydrogen pipes of the multiple hydrogen pipes constituting the hydrogen piping section (the hydrogen supply channel 22, the hydrogen discharge channel 24, and the circulation channel 25) connected to the fuel cell 110. An arrow II indicates a position of each connection portion between the fuel cell 110 and a hydrogen pipe that constitutes the hydrogen piping section connected to the fuel cell 110. An arrow III indicates a position of a connection portion between a hydrogen pipe and a device that is different from the fuel cell 110 and in which hydrogen flows, the device being disposed in the hydrogen piping section connected to the fuel cell 110 (the hydrogen pump 44 in the example of FIG. 4). By way of example, FIG. 4 illustrates that seven connection portions indicated by the arrows I, two connection portions indicated by the arrows II, and one connection portion indicated by the arrow III as well as the hydrogen sensor 50 are disposed to overlap the porous sheet 52 when viewed in the Y direction.

There is no limitation to the number of each kind of pipe connection portions (joints) which are, as indicated by the arrows I, II, and III, positioned to overlap the porous sheet 52 when viewed in the Y direction. In a typical example, the total number of pipe connection portions is two or more. "Another device that is different from the fuel cell 110 and connected to the hydrogen piping section to flow hydrogen therein" is not limited to the hydrogen pump 44 shown in FIG. 4 and may be, for example, the gas-liquid separator 45 or a valve disposed in the hydrogen piping section such as the open/close valve 46.

In FIG. 4, the dashed line indicates a layout area of the porous sheet 52. The porous sheet 52 may be secured inside the front compartment 70 by screwing, for example. Specifically, the porous sheet 52 may be screwed to brackets that are attached to multiple locations (e.g., five or six locations) such as on a surface of a casing of any device (e.g., the high-voltage unit 120) disposed in the front compartment 70 and on an inner wall of the front compartment 70. The porous sheet 52 may, however, be secured inside the front compartment 70 by any other means than screwing. In the present embodiment, the porous sheet 52 is secured inside the front compartment 70 at a location remote from the front hood 72.

In the fuel cell vehicle 10 mounted with the above configured hydrogen leakage detection system 12 of the present embodiment, the hydrogen flow section is disposed in the region below the porous sheet 52 within the front compartment 70 while the hydrogen sensor 50 is disposed in the region above the porous sheet 52 within the front compartment 70. When the inside of the front compartment 70 is viewed in the vertical direction, the plurality of pipe connection portions included in the hydrogen flow section and the hydrogen sensor 50 are disposed to overlap the porous sheet 52. This arrangement enables earlier detection of a hydrogen leakage by the hydrogen sensor 50 in the event that a defect occurs in any one of the above pipe connection portions and the high-pressure hydrogen inside the hydrogen flow section ejects from the defect site. This in turn enables earlier implementation of an action for stopping the hydrogen leakage or like actions, and thus increases safety.

Specifically, when a defect occurs in any one of the above pipe connection portions, hydrogen is ejected upward from the defect toward the porous sheet 52. As described above, the front compartment 70 accommodates various other devices (e.g., a device related to vehicle traveling and a device constituting a part of an air-conditioner) in addition to the fuel cell 110 and the high-voltage unit 120. Hence, even when the direction of hydrogen ejected from the defect is not upward, the hydrogen flow is redirected upward on contact with these nearby devices. When the upward hydrogen flow comes into contact with the porous sheet 52, the hydrogen flow is disturbed and spreads over the bottom surface of the porous sheet 52 to extend the range of the hydrogen flow while the hydrogen permeates the porous sheet 52 in the thickness direction thereof and goes further upward. As the fuel gas supplied to the fuel cell 110 is high-purity hydrogen gas, the concentration of hydrogen ejected from the defect is extremely higher than the limit of detection by the hydrogen sensor 50. Thus, as a result of the hydrogen flow contacting and permeating the porous sheet 52, an area where the hydrogen concentration is relatively high enough to be detectable by the hydrogen sensor 50 increases in the region above the porous sheet 52 as compared to the region below the porous sheet 52.

In the case where the hydrogen sensor 50 is disposed vertically above the defect, the hydrogen sensor 50 would be able to detect a hydrogen leakage quickly even without the porous sheet 52 because hydrogen ejected from the defect reaches the hydrogen sensor 50 directly. However, if a hydrogen leakage occurs in the absence of the porous sheet 52 of the present embodiment, at a location that does not vertically overlap the hydrogen sensor 50, the leaking hydrogen rises upward and temporarily accumulates inside the front hood 72. In this case, the hydrogen sensor 50 would not be able to detect the hydrogen leakage until the hydrogen concentration around the hydrogen sensor 50 increases to exceed the limit of detection by the hydrogen sensor 50. In the present embodiment, even when a defect site does not vertically overlap the hydrogen sensor 50, the presence of the porous sheet 52 can expand the area in which the concentration of rising hydrogen is at or above the limit of detection by the hydrogen sensor 50. Eventually, the hydrogen sensor 50 can detect rising hydrogen and can detect a hydrogen leakage at an earlier timing.

As explained, the presence of the porous sheet 52 can expand the area in which the concentration of rising hydrogen is at or above the limit of detection by the hydrogen sensor 50. As a result, even when there is a plurality of defect-prone locations where hydrogen leakages may occur (the pipe connection portions described above), the single hydrogen sensor 50 can detect any hydrogen leakage in the plurality of pipe connection portions. It is thus possible to reduce the number of hydrogen sensors 50 required for hydrogen leakage detection.

To ensure even quicker detection of any hydrogen leakage by the hydrogen sensor 50 at a location that does not vertically overlap the hydrogen sensor 50, some parameters (such as the open area percentage of the porous sheet 52, a distance between the porous sheet 52 and the plurality of pipe connection portions described above, and a distance between the porous sheet 52 and the hydrogen sensor 50) may be set appropriately as a function of factors such as an expected flow rate of a hydrogen flow ejected from a defect and the limit of detection by the hydrogen sensor 50.

In the present embodiment, the porous sheet 52 horizontally expands the region with a high concentration of rising hydrogen, which enables detection of the rising hydrogen by the hydrogen sensor 50. Consequently, the hydrogen sensor 50 can be disposed at a position lower than the front hood 72 covering the upper end of the front compartment 70. As such, the layout of the hydrogen sensor 50, which no longer needs to be placed on the front hood 72 that is configured to open and close, can be more flexible without being constrained by routings and other restrictions.

Additionally, in the present embodiment, the presence of the porous sheet 52 can increase safety because the porous sheet 52 prevents an operator or any other person from touching high-voltage devices, such as the high-voltage unit 120, disposed below the porous sheet 52 when he/she opens the front hood 72. Further, the presence of the porous sheet 52 can increase safety in the event that a device disposed below the porous sheet 52 breaks for any reason, because the porous sheet 52 prevents broken parts from flying off.

Figure 5:
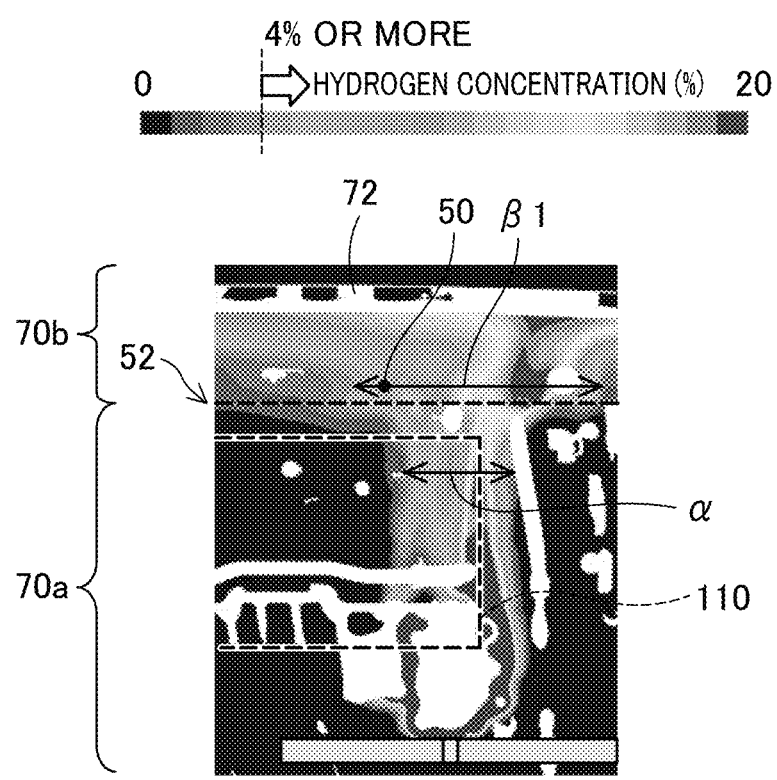
FIG. 5 shows a simulation result for a hydrogen leakage detection system of an exemplary embodiment.
Figure 6:
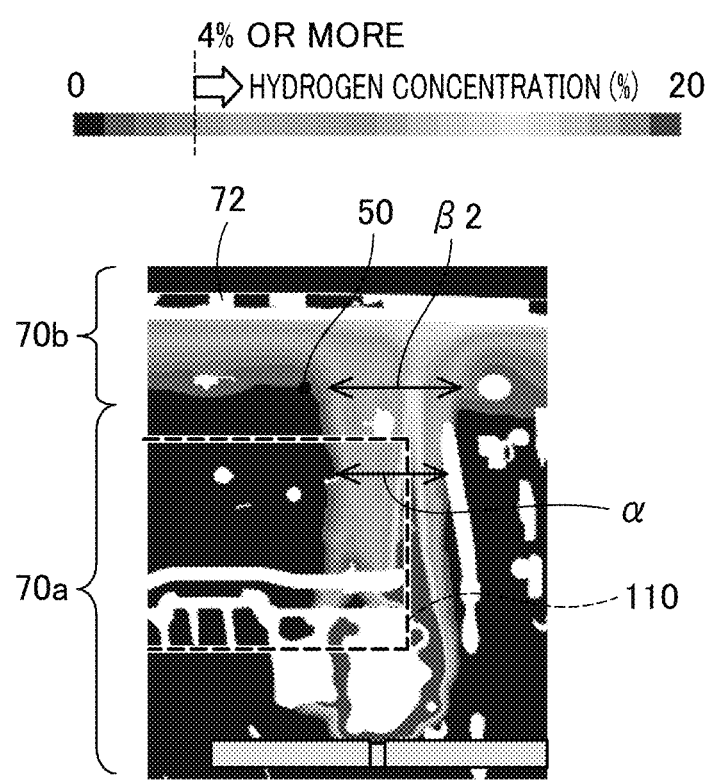
FIG. 6 shows a simulation result for a hydrogen leakage detection system of a comparative example.

FIG. 5 shows a result of a simulation carried out to confirm the effect of the hydrogen leakage detection system 12 of the present embodiment. FIG. 6 shows, similarly to FIG. 5, a result of a simulation carried out for a comparative example without the porous sheet 52. FIGS. 5 and 6 are horizontal views inside the front compartment 70, and each depicts a hydrogen concentration distribution therein when hydrogen leaks from a joint of pipes routed below the fuel cell 110. Except for the presence or absence of the porous sheet 52, FIGS. 5 and 6 show results of simulations carried out under the same conditions. Specifically, the conditions that gave the simulation results shown in FIGS. 5 and 6 were set such that a hydrogen pressure inside the pipes was 200 kPa, a hydrogen flow rate inside the pipes was 25 NL/min, an ejecting direction of hydrogen from the joint was vertically upward, a concentration of hydrogen leaking from the joint was 100%, and the size of the leakage site in the pipes was 10 mm in diameter. In FIG. 5, the open area percentage of the mesh serving as the porous sheet 52 was 30%. In FIGS. 5 and 6, the leakage site in the pipes was set at a position where hydrogen ejected vertically upward came into contact with the bottom of the fuel cell 110, and the limit of detection by the hydrogen sensor 50 was assumed to be a 3.5% hydrogen concentration.

Comparing FIGS. 5 and 6, the region 70*a* below the position of the porous sheet 52, which was disposed in FIG. 5, showed similar hydrogen concentration distributions in both FIGS. 5 and 6. In the region 70*a*, arrows α in FIGS. 5 and 6 indicate an example of portions that are at the same vertical distance from the leakage site and that have a hydrogen concentration of 4% or more. In the region 70*b* above the position of the porous sheet 52, arrows β1 and β2 in FIGS. 5 and 6 respectively indicate portions that horizontally overlap the hydrogen sensor 50 and that have a hydrogen concentration of 4% or more. Comparing FIGS. 5 and 6, while the length of the arrow α (width of the region with a 4% or more hydrogen concentration) is identical in FIGS. 5 and 6, the length of the arrow β1 in FIG. 5 is longer than that of the arrow β2 in FIG. 6. As shown, the hydrogen sensor 50 in FIG. 5 is within the portion with a 4% or more hydrogen concentration, but the hydrogen sensor 50 in FIG. 6 is situated outside the portion with a 4% or more hydrogen concentration. The comparison between FIGS. 5 and 6 indicates that adopting the porous sheet 52 enables earlier detection of a hydrogen leakage.

Figure 7:
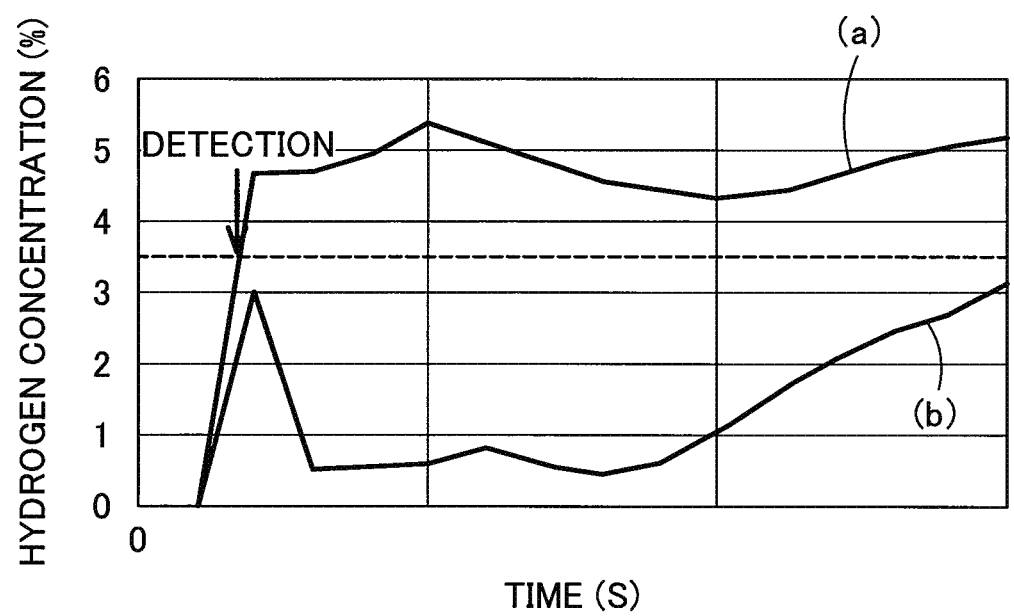
FIG. 7 is a graph representing changes in hydrogen concentration at a location of the hydrogen sensor.

FIG. 7 is a graph regarding the simulation results shown in FIGS. 5 and 6 and represents changes in hydrogen concentration at the location where the hydrogen sensor 50 was disposed. Graph data (a) correspond to the simulation result in FIG. 5 in accordance with the present embodiment, and graph data (b) correspond to the simulation result in FIG. 6 in accordance with the comparative example. FIG. 7 shows changes in hydrogen concentration over time at the location where the hydrogen sensor 50 was disposed, with the timing at which a hydrogen leakage occurred in the pipe joint being defined as time 0. FIG. 7 verifies that the embodiment providing the porous sheet 52 enabled earlier detection of a hydrogen leakage because the porous sheet 52 expanded the area with a high hydrogen concentration and thus caused a rapid increase in hydrogen concentration around the hydrogen sensor 50. On the other hand, FIG. 7 verifies that the comparative example without the porous sheet 52 had a much slower increase in hydrogen concentration around the hydrogen sensor 50. The graph data (b) corresponding to the comparative example show a relatively high hydrogen concentration at the location of the hydrogen sensor 50, immediately after the onset of the hydrogen leakage. This would be because the leaking hydrogen, which immediately came into contact with nearby structures such as the fuel cell 110 and had the hydrogen flow disturbed, formed a mass with a relatively high hydrogen concentration and this mass rose upward and passed the position of the hydrogen sensor 50.

Figure 8:
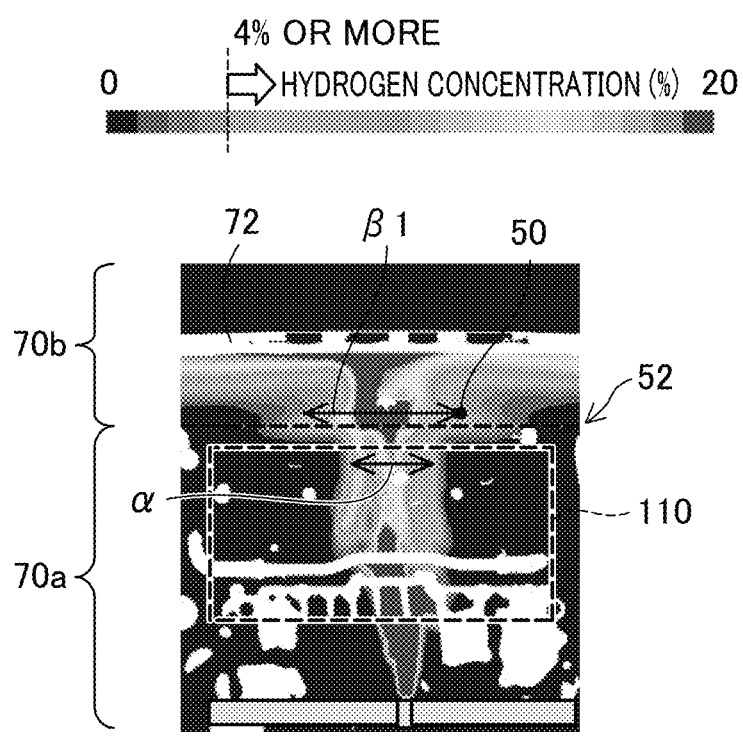
FIG. 8 shows a simulation result for the hydrogen leakage detection system of the exemplary embodiment.
Figure 9:
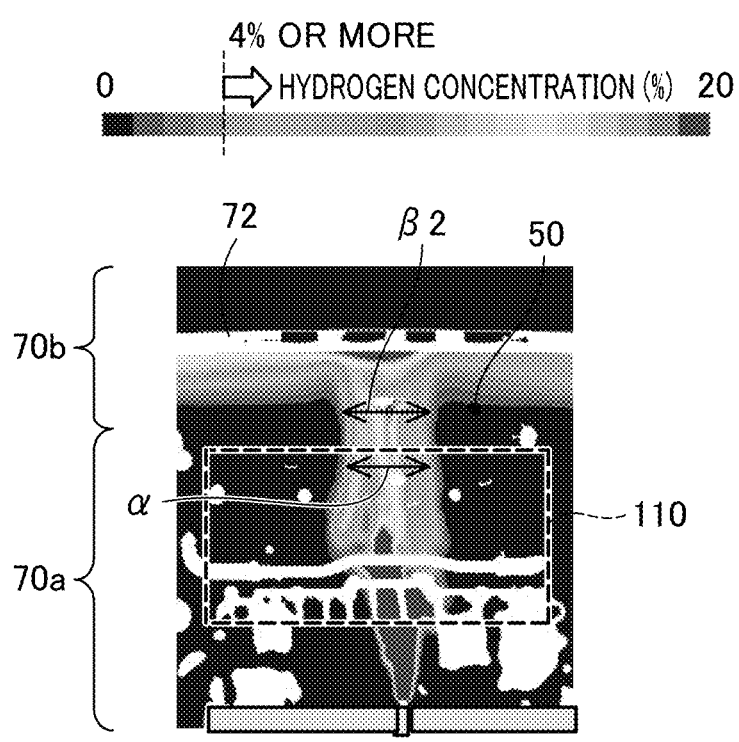
FIG. 9 shows a simulation result for a hydrogen leakage detection system of a comparative example.

FIGS. 8 and 9 show results of simulations similarly to FIGS. 5 and 6, but the simulations were carried out under a different condition as compared to the simulations relating to FIGS. 5-7. FIG. 8 shows a result of a simulation in accordance with the present embodiment having the porous sheet 52, and FIG. 9 shows a result of a simulation in accordance with a comparative example without the porous sheet 52. Except for the location of a hydrogen leakage site, the conditions that gave the simulation results shown in FIGS. 8 and 9 were the same as those in FIGS. 5 and 6. In FIGS. 8 and 9, the leakage site in the pipes was set at a position where hydrogen ejected vertically upward flowed upward without contacting any nearby device such as the fuel cell 110.

Similarly to FIGS. 5 and 6, the region 70*a* below the position of the porous sheet 52 showed similar hydrogen concentration distributions in both FIGS. 8 and 9, regardless of the presence or absence of the porous sheet 52 (see arrows α in FIGS. 8 and 9). In the region 70b above the position of the porous sheet 52, the width of a portion with a hydrogen concentration of 4% or more is longer in FIG. 8 than in FIG. 9 (see arrows β1 and β2 in FIGS. 8 and 9, respectively). The hydrogen sensor 50 in FIG. 8 is situated within the portion with a 4% or more hydrogen concentration, but the hydrogen sensor 50 in FIG. 9 is not. This comparison indicates that adopting the porous sheet 52 enables earlier detection of a hydrogen leakage even when the leakage site is located as illustrated in FIGS. 8 and 9.

Figure 10:
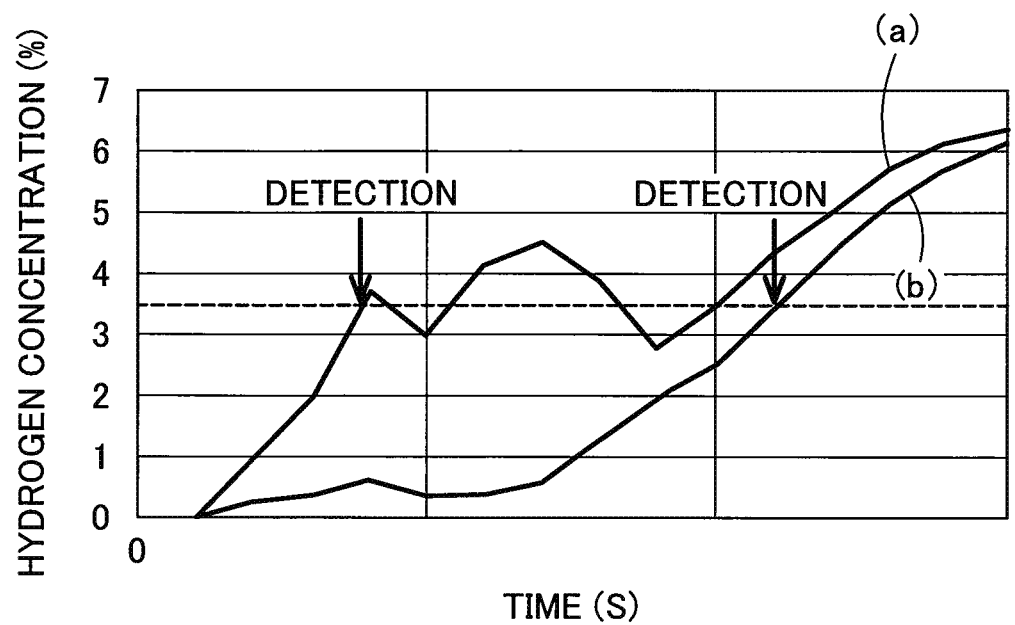
FIG. 10 shows a graph representing changes in hydrogen concentration at a location of the hydrogen sensor.

FIG. 10 is a graph regarding the simulation results shown in FIGS. 8 and 9 and, similarly to FIG. 7, represents changes in hydrogen concentration at the location where the hydrogen sensor 50 was disposed. Graph data (a) correspond to the simulation result in FIG. 8 in accordance with the present embodiment, and graph data (b) correspond to the simulation result in FIG. 9 in accordance with the comparative example. FIG. 10 verifies that the embodiment providing the porous sheet 52 enabled detection of a hydrogen leakage at an earlier timing than the comparative example because the porous sheet 52 expanded the area with a high hydrogen concentration and thus caused a rapid increase in hydrogen concentration around the hydrogen sensor 50.

B. Second Embodiment

Figure 11:
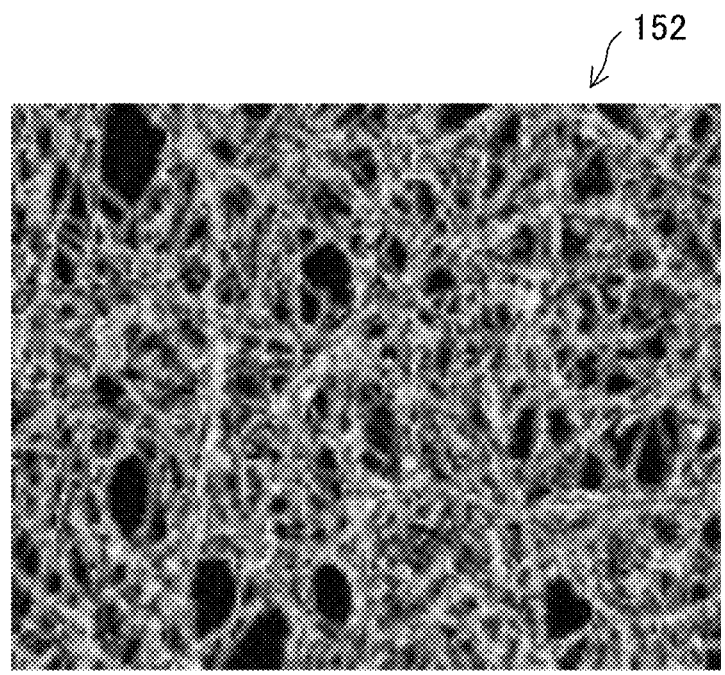
FIG. 11 is a plan view of a porous sheet.

FIG. 11 is a plan view of a porous sheet 152 in the second embodiment of the present disclosure. The porous sheet 152 in the second embodiment is used similarly to the porous sheet 52 in the first embodiment. As shown in FIG. 11, the porous sheet 152 is formed of a porous body. Examples of the porous body constituting the porous sheet 152 may include porous materials having a skeleton of a three-dimensional network structure, and foams. The porous sheet 152 may be made of a metal or resin material similar to that for the porous sheet 52 in the first embodiment.

Similarly to the porous sheet 52, when hydrogen leaking from a connection portion between the pipes and the like flows onto a surface of the porous sheet 152, the porous sheet 152 functions to disturb the hydrogen flow to spread it over the surface while allowing permeation of hydrogen through the porous sheet 152 in the thickness direction thereof. Thus, the open area percentage of the porous sheet 152 is preferably not less than 10%, and more preferably not less than 20%, for the same reasons as for the porous sheet 52. Also, the open area percentage of the porous sheet 152 is preferably not more than 60%, and more preferably not more than 50%, for the same reasons as for the porous sheet 52. The open area percentage of the porous sheet 152 may, however, be less than 10% or more than 60%. The open area percentage of the porous sheet 152 in plan view may be obtained in the following manner. For example, an image of the surface of the porous sheet 152 may be captured with a camera and magnified five times, and then, through image processing, a percentage of a total area of portions penetrating in the thickness direction of the porous sheet 152 to an entire area of the porous sheet 152 may be calculated in a specific region within the image. The thickness of the porous sheet 152 is preferably not less than 0.2 cm, and more preferably not less than 0.5 cm, for the same reasons as for the porous sheet 52. Also, the thickness of the porous sheet 152 is preferably not more than 2.0 cm, and more preferably not more than 1.0 cm.

The porous sheet 152 with the above structure is disposed in the hydrogen leakage detection system 12 similarly to the porous sheet 52 in the first embodiment. The second embodiment can provide the same advantageous effects as the first embodiment, namely quicker detection of a hydrogen leakage by the hydrogen sensor 50 and a reduced number of hydrogen sensors 50. Besides, the porous material constituting the porous sheet 152 in the second embodiment has the three-dimensionally complicated structure as compared to the mesh constituting the porous sheet 52 in the first embodiment. This structure enhances the ability of the porous sheet 152 to spread a hydrogen flow over the surface thereof when hydrogen has flowed onto the surface from a defect in the pipe connection portions. As a result, the porous sheet 152 can further expand, in the region above the porous sheet 152, the area in which the hydrogen concentration is at or above the limit of detection by the hydrogen sensor 50, enabling even quicker detection of a hydrogen leakage by the hydrogen sensor 50.

C. Third Embodiment

Figure 12:
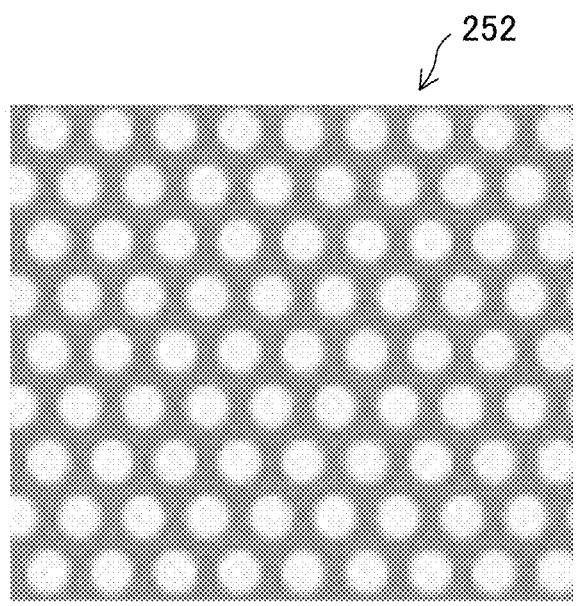
FIG. 12 is a plan view of a porous sheet.

FIG. 12 is a plan view of a porous sheet 252 in the third embodiment of the present disclosure. The porous sheet 252 in the third embodiment is used similarly to the porous sheet 52 in the first embodiment. As shown in FIG. 12, the porous sheet 252 is formed of a perforated metal. The porous sheet 252 may be made of a metal material similar to that for the porous sheet 52 in the first embodiment.

Similarly to the porous sheet 52, when hydrogen leaking from a connection portion between the pipes and the like flows onto a surface of the porous sheet 252, the porous sheet 252 functions to disturb the hydrogen flow to spread it over the surface while allowing permeation of hydrogen through the porous sheet 252 in the thickness direction thereof. Thus, the open area percentage of the porous sheet 252 is preferably not less than 10%, and more preferably not less than 20%, for the same reasons as for the porous sheet 52. Also, the open area percentage of the porous sheet 252 is preferably not more than 60%, and more preferably not more than 50%, for the same reasons as for the porous sheet 52. The open area percentage of the porous sheet 252 may, however, be less than 10% or more than 60%. The open area percentage of the porous sheet 252 in plan view may be obtained in the following manner. For example, an image of the surface of the porous sheet 252 may be captured with a camera and magnified five times, and then, through image processing, a percentage of a total area of holes in the perforated metal to an entire area of the porous sheet 252 may be calculated in a specific region within the image. The thickness of the porous sheet 252 is preferably not less than 0.2 cm, and more preferably not less than 0.5 cm, for the same reasons as for the porous sheet 52. Also, the thickness of the porous sheet 252 is preferably not more than 2.0 cm, and more preferably not more than 1.0 cm.

The porous sheet 252 with the above structure is disposed in the hydrogen leakage detection system 12 similarly to the porous sheet 52 in the first embodiment. The third embodiment can provide the same advantageous effects as the first embodiment, namely quicker detection of a hydrogen leakage by the hydrogen sensor 50 and a reduced number of hydrogen sensors 50. Besides, in general, the perforated metal constituting the porous sheet 252 greatly disturbs a gas flow having passed the sheet (through the holes in the perforated metal) as compared to meshes and other similar structures. Hence, the perforated metal enhances the ability of the porous sheet 252 to spread a hydrogen flow over the surface thereof when hydrogen has flowed onto the surface from the pipe connection portion. As a result, the porous sheet 252 can further expand the area in which the hydrogen concentration is at or above the limit of detection by the hydrogen sensor 50, in the region above the porous sheet 252. In the case of using the perforated metal, a diameter of holes in the perforated metal and a pitch, namely a distance between the holes, can be changed to facilitate adjustment of the open area percentage of the porous sheet 252 to a desired one. Further in the case of using the perforated metal, it is easily possible to ensure the strength of the porous sheet while reducing its thickness, so that deformation of the porous sheet 252 can be restrained even when hydrogen ejected from the pipe connection portion collides with the porous sheet 252.

D. Alternative Embodiments (D1) While the porous sheet in each of the above embodiments is disposed remotely from the hydrogen sensor 50 and the plurality of pipe connection portions, other arrangements are possible. For example, a part of the hydrogen sensor 50, e.g., a distal end thereof, may be in contact with the porous sheet. Alternatively, a part of the plurality of pipe connection portions may be in contact with the porous sheet. Nonetheless, in order to increase the effect of the porous sheet to horizontally spread hydrogen that has been ejected from a defect in the pipe connection portions and contacted the porous sheet, it is desirable that all of the plurality of pipe connection portions be remote from the porous sheet.

(D2) While the hydrogen leakage detection system 12 in each of the above embodiments includes the single porous sheet, other arrangements are possible. For example, a plurality of porous sheets may be arranged in the front compartment 70 in a horizontally offset manner. This arrangement can provide the same advantages as the above embodiments by disposing at least one porous sheet so as to delimit at least a part of the space within the front compartment 70, and by establishing the positional relationship of the at least one porous sheet, the plurality of pipe connection portions, and the hydrogen sensor 50 just as the positional relationship explained in the above embodiments.

(D3) While the front compartment 70 in each of the above embodiments serves as the outer shell that accommodates the hydrogen flow section including the fuel cell 110 and the hydrogen piping section connected to the fuel cell 110, other arrangements are possible. For example, the outer shell may be a structure defining an underfloor space below the vehicle cabin or may be a rear compartment behind the vehicle cabin.

(D4) While the hydrogen flow section in each of the above embodiments, accommodated in the outer shell and disposed in the region below the porous sheet, includes the fuel cell 110 and the hydrogen piping section connected to the fuel cell 110, other arrangements are possible. The hydrogen flow section accommodated in the outer shell may include the hydrogen tank 21 instead of or in addition to the fuel cell 110. This arrangement can provide the same advantages as the above embodiments by disposing the hydrogen flow section in the outer shell, the hydrogen flow section being arranged to include at least one device of the fuel cell 110 and the hydrogen tank 21, and the hydrogen piping section connected to the at least one device, and by establishing the positional relationship of the porous sheet, the plurality of pipe connection portions, and the hydrogen sensor 50 within the outer shell just as the positional relationship explained in the above embodiments.

(D5) In each of the above embodiments, the connection portions as well as the hydrogen sensor 50 are disposed to overlap the porous sheet when the inside of the outer shell is viewed in the vertical direction. While the connection portions may be any of the aforementioned three kinds of pipe connection portions, other arrangements are possible. The plurality of connection portions disposed to overlap the porous sheet may include connection portions different from the aforementioned pipe connection portions, and may simply be a connection portion in hydrogen channels included in the hydrogen flow section.

(D6) In each of the above embodiments, the connection portions as well as the hydrogen sensor 50 are disposed to overlap the porous sheet when the inside of the outer shell is viewed in the vertical direction. While each of the above embodiments adopts a plurality of connection portions, only one connection portion may suffice. This arrangement also allows the porous sheet to expand the region with a relatively high hydrogen concentration, and still enables quicker detection of a hydrogen leakage by the hydrogen sensor while providing flexibility in the layout of the hydrogen sensor.

(D7) In each of the above embodiments, the connection portions included in the hydrogen flow section and the hydrogen sensor are disposed to overlap the porous sheet when the inside of the outer shell is viewed in the vertical direction. Instead of the overlapped arrangement, however, other arrangements are possible. It is only required, within the outer shell, that the hydrogen flow section be disposed in the region below the porous sheet, and that the hydrogen sensor be disposed in the region above the porous sheet. Even when the connection portions, the hydrogen sensor, and the porous sheet do not overlap each other when the inside of the outer shell is viewed in the vertical direction, the porous sheet can still expand the region with a relatively high hydrogen concentration and can thus enable quicker detection of a hydrogen leakage by the hydrogen sensor, in such cases as where hydrogen ejected from a defect in the hydrogen flow section is directed to the porous sheet, where the vehicle mounted with the hydrogen leakage detection system 12 is tilted, and where leaking hydrogen is made to flow toward the porous sheet by, for example, inflow of traveling air into the outer shell.

(D8) While the hydrogen leakage detection system 12 is mounted on the fuel cell vehicle 10 in each of the above embodiments, other arrangements are possible. Instead of vehicles, the hydrogen leakage detection system 12 may be mounted on moving bodies mounted with a fuel cell or may be used in stationary power generators equipped with a fuel cell.

The present disclosure is not limited to the above embodiments and may be implemented in various different ways without departing from the scope of the disclosure. For example, the technical features of any of the above embodiment and the other embodiments may be replaced or combined appropriately, in order to solve part or all of the problems described above or in order to achieve part or all of the advantageous effects described above. Any of the technical features, unless being described as essential herein, may be omitted as appropriate. For example, the present disclosure may be implemented in the following aspects.

(1) An aspect of the present disclosure is a hydrogen leakage detection system for detecting a hydrogen leakage in a fuel cell system. The hydrogen leakage detection system includes an outer shell, a hydrogen sensor, and a porous sheet. The outer shell configured to accommodate a hydrogen flow section, including at least one device of a fuel cell and a hydrogen tank storing hydrogen to be supplied to the fuel cell; and a hydrogen piping section including a hydrogen pipe connected to the at least one device. The hydrogen sensor is disposed within the outer shell. The porous sheet is disposed to delimit at least a part of a space within the outer shell, and allows permeation of hydrogen through the porous sheet in a thickness direction thereof. The hydrogen flow section is disposed in a region below the porous sheet, and the hydrogen sensor is disposed in a region above the porous sheet. The hydrogen leakage detection system of this aspect has, within the outer shell, the hydrogen flow section disposed in a region below the porous sheet, and the hydrogen sensor disposed in a region above the porous sheet. In the event that any defect occurs in the hydrogen flow section and hydrogen inside the hydrogen flow section is ejected from the defect site, this arrangement allows permeation of the ejected hydrogen through the porous sheet, and thus can expand a region with a hydrogen concentration high enough to be detectable by the hydrogen sensor. Hence, this arrangement enables quicker detection of a hydrogen leakage by the hydrogen sensor.

(2) In the hydrogen leakage detection system of the above aspect, when an inside of the outer shell is viewed in a vertical direction, a connection portion of a hydrogen channel and the hydrogen sensor may be disposed to overlap the porous sheet. The connection portion in included in the hydrogen flow section. In the event of any hydrogen leakage caused by a defect in the connection portion of the hydrogen channel included in the hydrogen flow section, the hydrogen leakage detection system of this aspect enables quicker detection of the hydrogen leakage by the hydrogen sensor.

(3) In the hydrogen leakage detection system of the above aspect, when the inside of the outer shell is viewed in the vertical direction, a plurality of the connection portions may be disposed to overlap the porous sheet. In the event of any hydrogen leakage caused by a defect in any one of the plurality of the connection portions, the hydrogen leakage detection system of this aspect enables quicker detection of the hydrogen leakage by the hydrogen sensor without increasing the number of hydrogen sensors.

(4) The hydrogen leakage detection system of the above aspect may further include another device that is different from the at least one device. The another device connected to the hydrogen piping section to flow hydrogen therein. The hydrogen piping section includes a plurality of hydrogen pipes. The connection portion may include any one of a connection portion between adjoining hydrogen pipes of the plurality of hydrogen pipes, a connection portion between one of the plurality of hydrogen pipes and the at least one device, and a connection portion between one of the plurality of hydrogen pipes and the other device. In the event of any hydrogen leakage occurring in the connection portion, which is relatively prone to a hydrogen leakage, the hydrogen leakage detection system of this aspect enables quick detection of the hydrogen leakage.

(5) In the hydrogen leakage detection system of the above aspect, the porous sheet may have an open area percentage of from 20 to 50%. The hydrogen leakage detection system of this aspect enhances the ability of the porous sheet to spread hydrogen ejected from a pipe connection portion over the surface of the porous sheet, while ensuring efficient permeation of hydrogen through the porous sheet in the thickness direction thereof.

(6) The hydrogen leakage detection system of the above aspect may be mounted on a fuel cell vehicle. The outer shell may be a front compartment of the fuel cell vehicle. The hydrogen sensor may be secured to a portion of an inner wall of the front compartment other than a front hood that is configured to open and close the front compartment. As the hydrogen sensor is secured to a position different from the front hood, the hydrogen leakage detection system of this aspect provides higher flexibility in the layout of the hydrogen sensor without being constrained by routings and other restrictions. The hydrogen leakage detection system of this aspect also enables quicker detection of a hydrogen leakage by the hydrogen sensor because the hydrogen sensor in this arrangement can detect rising hydrogen.

The present disclosure may be implemented in various forms other than the hydrogen leakage detection system. For example, the present disclosure may be implemented in the form of a fuel cell system used in combination with a hydrogen leakage detection system, a fuel cell vehicle mounted with a hydrogen leakage detection system, a stationary power source equipped with a hydrogen leakage detection system and a fuel cell system, or a hydrogen leakage detection method.

What is claimed is:

1. A hydrogen leakage detection system configured to detect a hydrogen leakage in a fuel cell system, the system comprising:
    an outer shell configured to accommodate a hydrogen flow section, including at least one device of a fuel cell or a hydrogen tank storing hydrogen to be supplied to the fuel cell; and a hydrogen piping section including a hydrogen pipe connected to the at least one device;
    a hydrogen sensor disposed within the outer shell; and
    a porous sheet disposed to delimit at least a part of a space within the outer shell, and allowing permeation of hydrogen through the porous sheet in a thickness direction thereof, wherein
    the hydrogen flow section is disposed in a region below the porous sheet, and the hydrogen sensor is disposed in a region above the porous sheet;
wherein
    the hydrogen leakage detection system is mounted on a fuel cell vehicle,
    the outer shell is a front compartment of the fuel cell vehicle, and
    the hydrogen sensor is secured to a portion of an inner wall of the front compartment other than a front hood that is configured to open and close the front compartment.

2. The hydrogen leakage detection system according to claim 1, wherein
    when an inside of the outer shell is viewed in a vertical direction, a connection portion of a hydrogen channel and the hydrogen sensor are disposed to overlap the porous sheet, wherein
    the connection portion is included in the hydrogen flow section.

3. The hydrogen leakage detection system according to claim 2, wherein
    when the inside of the outer shell is viewed in the vertical direction, a plurality of connection portions is disposed to overlap the porous sheet.

4. The hydrogen leakage detection system according to claim 2, further comprising another device that is different from the at least one device, wherein
    the another device connected to the hydrogen piping section to flow hydrogen therein,
    the hydrogen piping section includes a plurality of hydrogen pipes,
    the connection portion comprises any one of a connection portion between adjoining hydrogen pipes of the plurality of hydrogen pipes, a connection portion between one of the plurality of hydrogen pipes and the at least one device, or a connection portion between one of the plurality of hydrogen pipes and the another device.

5. The hydrogen leakage detection system according to claim 1, wherein
the porous sheet has an open area percentage of from 20 to 50%.

* * * * *